US011717899B2

(12) United States Patent
Alby et al.

(10) Patent No.: US 11,717,899 B2
(45) Date of Patent: Aug. 8, 2023

(54) LOCK BOLT COLLAR REMOVAL TOOL

(71) Applicant: THE BOEING COMPANY, Chicago, IL (US)

(72) Inventors: Avery C. Alby, Renton, WA (US); Wyatt J. Lofftus, Renton, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 15/672,471

(22) Filed: Aug. 9, 2017

(65) Prior Publication Data
US 2019/0047063 A1 Feb. 14, 2019

(51) Int. Cl.
*B23D 29/00* (2006.01)
*B26B 17/00* (2006.01)
*B23D 15/14* (2006.01)
*B64F 5/40* (2017.01)

(52) U.S. Cl.
CPC .......... *B23D 29/007* (2013.01); *B26B 17/003* (2013.01); *B23D 15/14* (2013.01); *B64F 5/40* (2017.01)

(58) Field of Classification Search
CPC ................. B23D 29/007; B26B 17/003
See application file for complete search history.

(56) References Cited

U.S. PATENT DOCUMENTS

| 59,673 | A | * | 11/1866 | Smith | B26B 17/003 30/183 |
| 1,156,745 | A | * | 10/1915 | Brady | B26B 17/003 30/272.1 |
| 1,653,340 | A | * | 12/1927 | Carolus | B26B 17/003 30/191 |
| 2,179,732 | A | * | 11/1939 | Scanlon | B23D 29/023 30/252 |
| 3,376,638 | A | * | 4/1968 | Bjalme | B23D 21/08 30/102 |
| 4,083,111 | A | * | 4/1978 | Kerins | B23C 1/20 30/168 |
| 4,246,699 | A | * | 1/1981 | Van Riper | B26B 17/003 30/182 |
| 4,296,552 | A | * | 10/1981 | Sabatino | B26B 17/003 30/183 |
| 4,346,518 | A | * | 8/1982 | Wood | B26B 17/003 30/190 |
| 4,602,629 | A | * | 7/1986 | Schnirman | A61B 17/12 606/174 |

(Continued)

*Primary Examiner* — Evan H MacFarlane
*Assistant Examiner* — Fernando A Ayala
(74) *Attorney, Agent, or Firm* — Quinn IP Law

(57) ABSTRACT

A blade assembly for cutting a member which surrounds a bolt member includes a first blade comprising a first cutting edge aligned with a first cutting plane which extends in a first direction from the first cutting edge; a second blade comprising a second cutting edge aligned with a second cutting plane which extends in a second direction from the second cutting edge; and a third blade comprising a third cutting edge aligned with a third cutting plane which extends in the second direction from the third cutting edge, wherein the first, second and third blades are associated with one another. The first cutting edge is spaced apart from the second and third cutting edges and the first cutting plane extends between the second and third cutting planes.

20 Claims, 6 Drawing Sheets

(56) References Cited

U.S. PATENT DOCUMENTS

| | | | | |
|---|---|---|---|---|
| 4,698,909 | A | * 10/1987 | Sleigh | B23D 29/007 |
| | | | | 30/180 |
| 4,704,793 | A | 11/1987 | Lockey | |
| 4,989,325 | A | * 2/1991 | Durkin | B26B 17/003 |
| | | | | 30/185 |
| 5,479,710 | A | * 1/1996 | Aston | B23D 29/007 |
| | | | | 30/175 |
| 6,128,976 | A | * 10/2000 | Tarpill | H02G 1/1224 |
| | | | | 30/91.2 |
| 6,237,449 | B1 | * 5/2001 | Orlosky | B25B 13/5058 |
| | | | | 81/360 |
| D591,126 | S | * 4/2009 | Groten | B23D 21/08 |
| | | | | D8/60 |
| 2002/0170406 | A1 | * 11/2002 | Cerda | B26B 17/02 |
| | | | | 83/639.1 |
| 2005/0198833 | A1 | * 9/2005 | Lin | B26B 29/04 |
| | | | | 30/92 |

\* cited by examiner

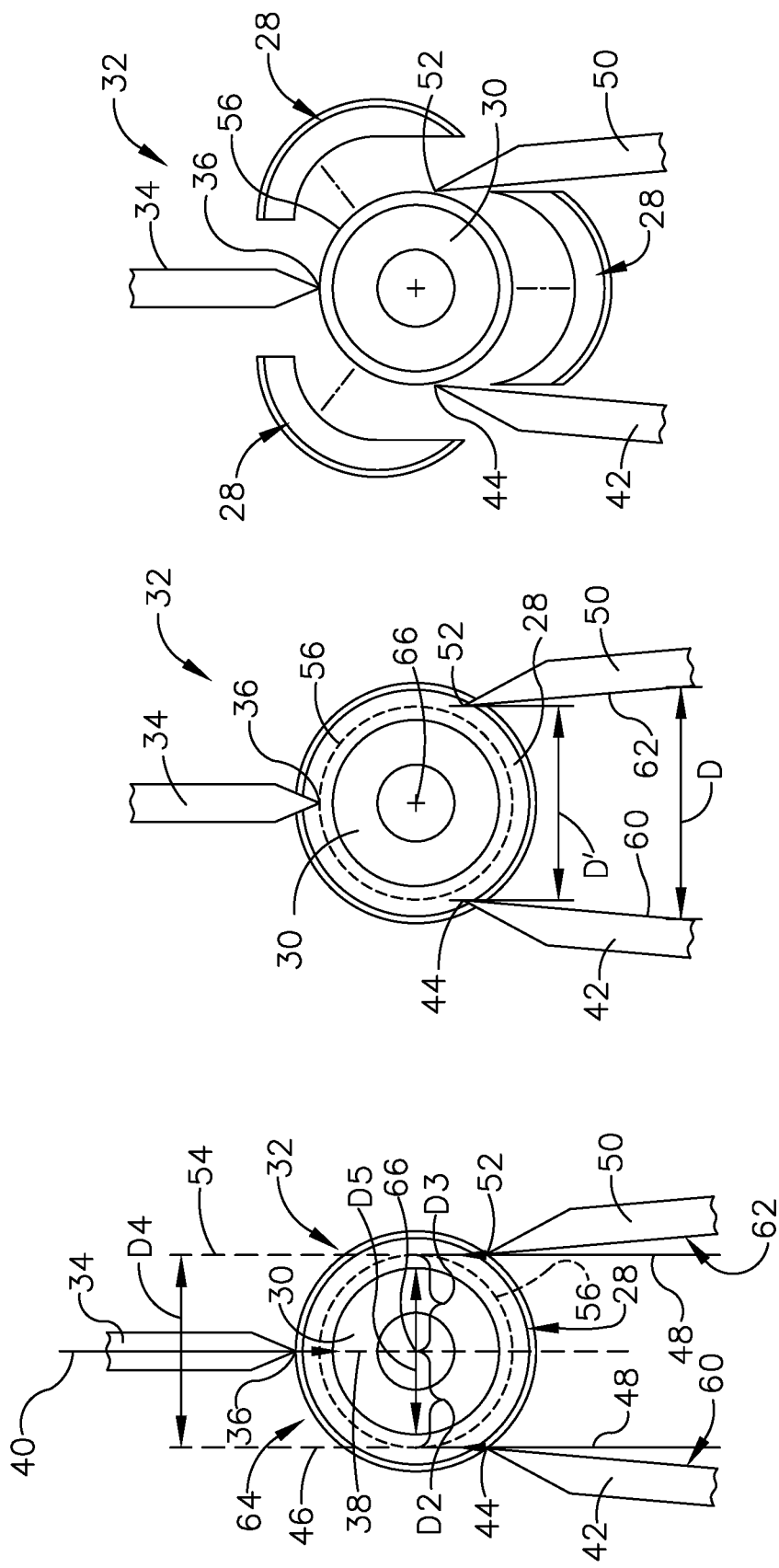

LOCK BOLT COLLAR REMOVAL TOOL

FIELD

This disclosure relates to a cutting assembly and more particularly to a cutting tool for cutting and removing a swaged collar from a lock bolt or a nut from a bolt.

BACKGROUND

Fasteners such as a nut and bolt assembly or a swaged collar and a lock bolt assembly secure and join two or more parts together with a compression force. The compression force is applied to the parts by the nut and a head of the bolt in the nut and bolt assembly and by the swaged collar and a head of the lock bolt in the swaged collar and the lock bolt assembly. These fasteners are used in the assembly of a wide variety of structural assemblies such as aircraft, trucks as well as in a wide variety of structural assemblies which need strong securements. At times these joined parts need to be released from one another for purposes of maintenance or replacement of one or more of the parts. As a result, there is a need to be able to easily remove these fastener assemblies from the joined parts without causing damage to the joined parts and without imparting undue wear on the device used to remove the fastener assembly.

Cutting tool devices have been employed to cut the nut or to cut the swaged collar from their respective bolt members in order to release the joined parts from securement. These cutting tool devices include two blades which cut in the same plane. This configuration of the two blades, particularly in the instance of cutting a swaged collar, the two blades tend to crimp the swaged collar into two halves onto the bolt member wherein the swaged collar remained in securement with the bolt member. The swaged collar has collar material positioned within threaded recesses in the bolt member wherein the collar material positioned within the recesses was prevented by the threads from being fully cut by the blades. As a result, the blades in the process of cutting the collar tended to crimp the collar onto the bolt member. In this instance, the user of the cutting device may have to re-cut the collar to finally remove the collar from the bolt member adding to the wear to the cutting device.

Additionally, the two blade cutting tool device used to remove the swaged collar or nut from a bolt member allows the two blades to over travel through the collar or the nut. The bolt member being constructed of a relatively hard material results in the blades of the cutting tool device experiencing very high loads upon the blades impacting the bolt member once the blades had cut through the swaged collar or nut. This impact force is also experienced by the tool assembly. These very high impact loads cause excessive wear to the blade edges and cause fatigue to the tool assembly. The excessive wear leads to blade replacement and ultimately to tool failure.

The two blades of the cutting tool device are positioned within a tapered bore wherein the blades are pulled into the tapered configuration and in turn are pushed toward one another imparting a cutting force onto opposing sides of the swaged collar. These blades can travel in an arc and engage the part being released from the fastener assembly causing damage to the part. Additionally, the positioning of the blades within a tapered portion of the cutting tool assembly requires disassembly of the cutting tool for replacement of the cutting blades. As a result, there is tool down time and a requirement of trained personnel to disassemble the cutting tool for the blade replacement.

There is a need for a nut or swaged collar cutting tool that will reliably cut the nut or swaged collar from their associated bolt member without subjecting all of the blades of the cutting tool to excessive forces against the bolt member associated with the respective nut or swaged collar which reduces the useful life for the blades and the tool assembly. There is a need to cut the nut or swaged collar without damaging the part secured by the fastener assembly. There is also a need in the instance of cutting a swaged collar to accomplish a reliable cut so as not to have to re-cut the swaged collar in an attempt to remove the swaged collar from its bolt member. In addition, there is a need to make replacement of the blades an exercise that does not require a full tool disassembly.

SUMMARY

An example includes a blade assembly for cutting a member which surrounds a bolt member which includes: a first blade having a first cutting edge aligned with a first cutting plane which extends in a first direction from the first cutting edge; a second blade having a second cutting edge aligned with a second cutting plane which extends in a second direction from the second cutting edge; and a third blade having a third cutting edge aligned with a third cutting plane which extends in the second direction from the third cutting edge. The first, second and third blades are associated with one another, such that: the first cutting edge is spaced apart from the second and third cutting edges and the first cutting plane extends between the second and third cutting planes.

An example includes a cutting tool for cutting a member which surrounds a bolt member, which includes: a first blade holder securing a first blade having a first cutting edge aligned with a first cutting plane which extends in a first direction from the first cutting edge; a second blade holder securing a second blade having a second cutting edge aligned with a second cutting plane which extends in a second direction from the second cutting edge; a third blade holder securing a third blade having a third cutting edge aligned with a third cutting plane which extends in the second direction from the third cutting edge. The first blade holder, second blade holder and third blade holder are associated with one another such that with the first blade holder, on the one hand, and the second and third blade holder, on the other hand, are movable relative to one another. The first cutting edge is spaced apart from the second and third cutting edges and the first cutting plane extends between the second and third cutting planes.

An example includes a method of cutting a member which surrounds a bolt member, which includes the step of positioning a bolt member with a member which surrounds the bolt member between a first cutting edge of a first blade, a second cutting edge of a second blade and a third cutting edge of a third blade member. The method further includes the step of moving at least one of: the first cutting edge within a first cutting plane, on the one hand, or the second cutting edge in a second cutting plane and third cutting edge in a third cutting plane, on the other hand, such that the member which surrounds the bolt member is cut into three pieces.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 3 is a schematic to top plan view of the swaged collar and bolt member of FIG. 2 with a blade assembly for cutting the swaged collar in a first position;

FIG. 4 is the schematic top plan view of FIG. 3 with the blade assembly having partially cut the swaged collar which surrounds the bolt member;

FIG. 5 is the schematic top plan view of FIG. 4 with the blade assembly having cut the swaged collar which surrounds the bolt member into three pieces;

DESCRIPTION

As was mentioned earlier, fastener assemblies which include a nut with a bolt member or a swaged collar with a bolt member, are common fastener assemblies used in assembling and securing parts together in a strong secure fashion for assembly of many different types of structures. There are numerous examples of structures that require reliable securement of parts such as with the assembly of aircraft, trucks and many other structures. There is often a need to maintenance or replace the parts joined together with these fastener assemblies and therefore the fastener assemblies need to be removed to access the particular part that needs maintenance or replacement.

As a result, as was also discussed earlier, there is a need for being able to cut a nut or swaged collar from a bolt member wherein the bolt member is constructed of a hard metal and the nut or swaged collar are constructed of a relatively softer metal. There is a need to cut the nut or swaged collar without subjecting all of the blades utilized to excessive forces resulting from the blades impacting the harder metal composition of the bolt member. With avoiding imparting excessive forces to some of the cutting blades, the useful life of the blades and the cutting tool that carries the blades can be extended. There is also a need for the cutting of the nut or swaged collar to be reliable without a need for having to re-cut the nut or swaged collar in order to remove it from the bolt member, which saves time and the also extends the useful life of the blades and the tool carrying the blades.

Figure 1:
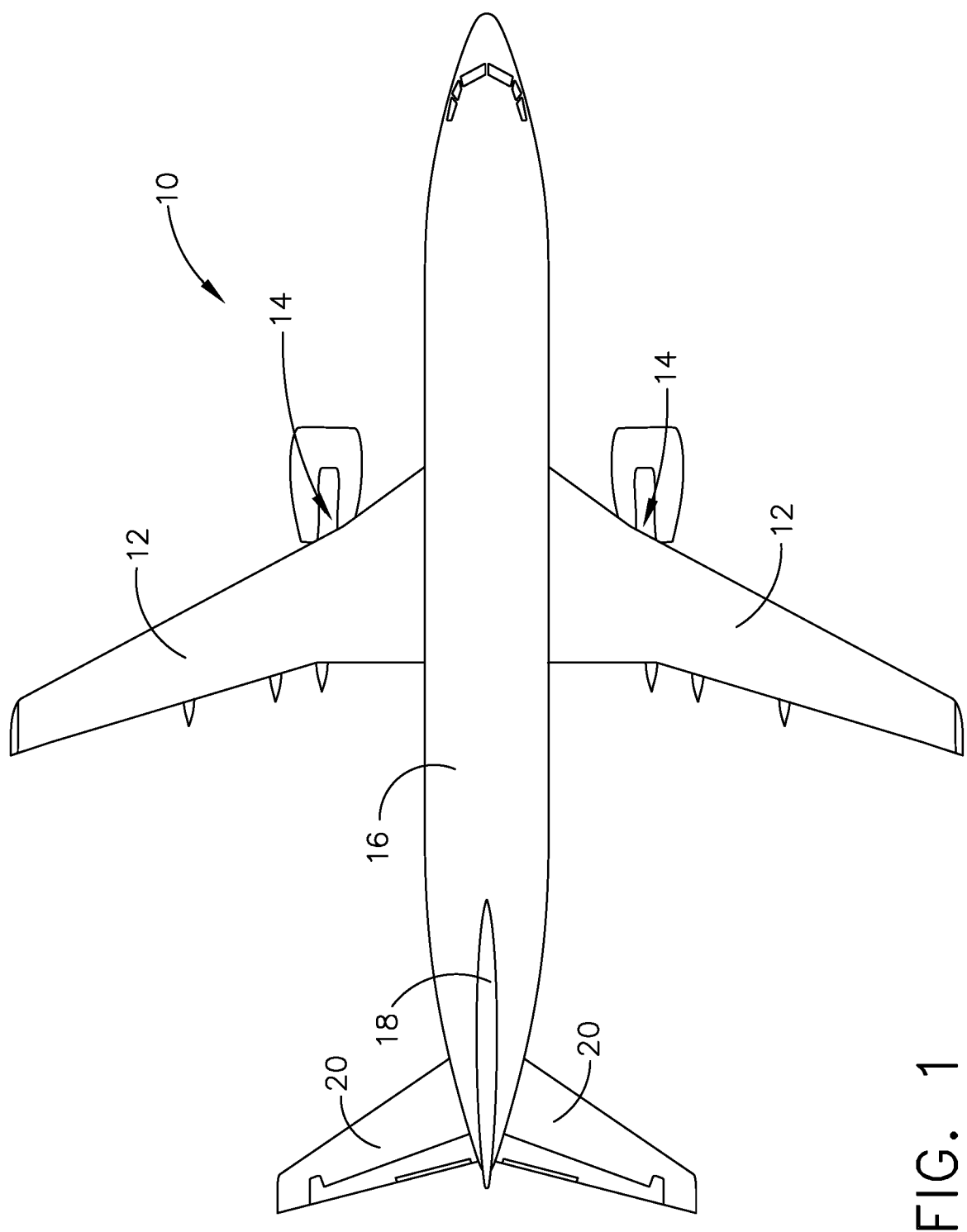
FIG. 1 is a top plan view of an aircraft.

An example of a structural assembly that requires strong securements is that of aircraft 10, as seen in FIG. 1. Various assemblies of aircraft 10 such as wings 12, engine mounts 14, fuselage 16, vertical stabilizer 18 and horizontal stabilizer 20 as well as other assemblies of aircraft 10 have parts that are joined together that require a strong securement of the parts and which utilize fastener assemblies such as a nut and bolt member or a swaged collar and a bolt member.

Figure 2:
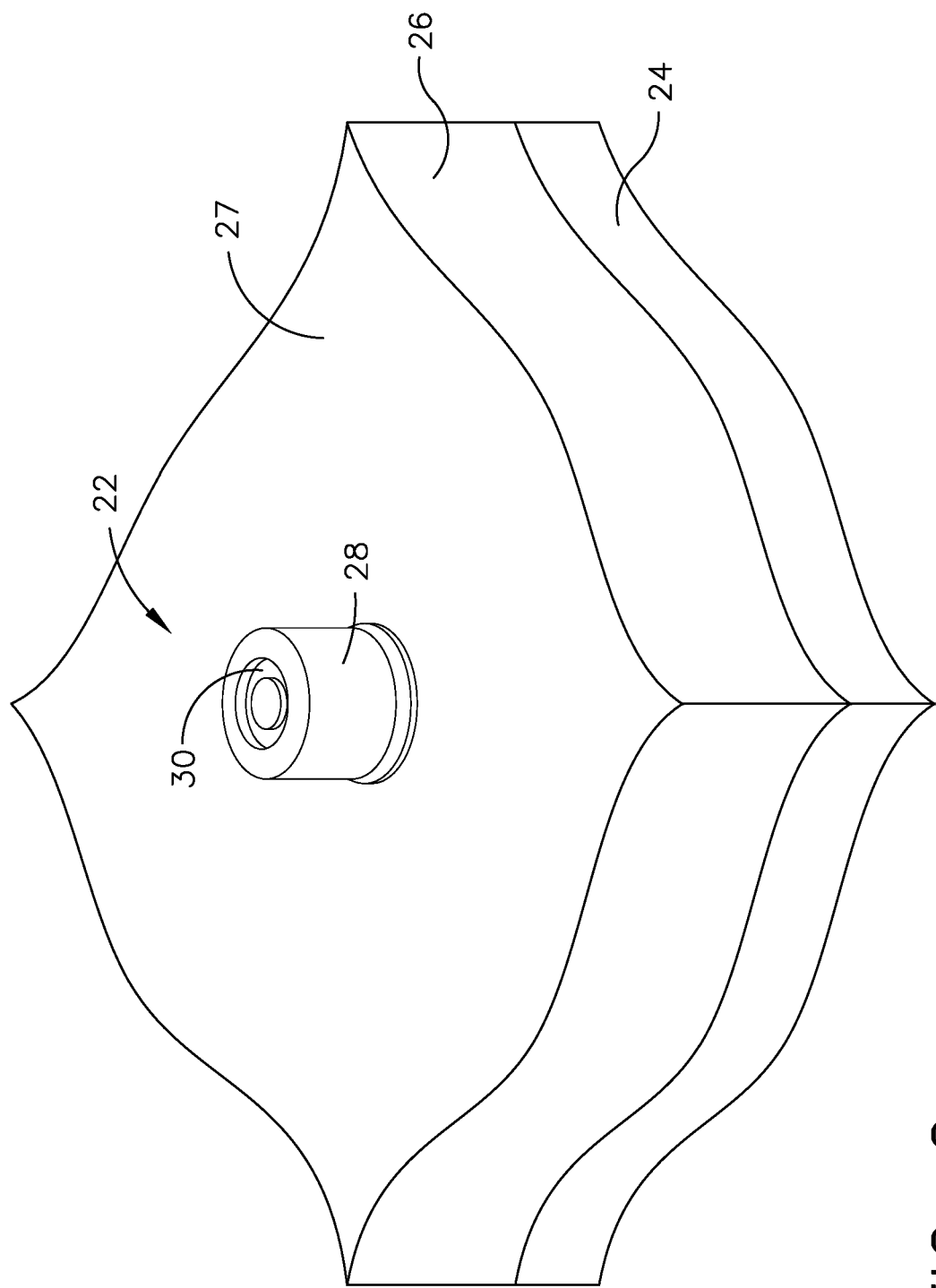
FIG. 2 is a partial perspective view of a swaged collar and bolt member assembly positioned securing two parts of a structural assembly.

An example of an employed fastener assembly 22, as seen in FIG. 2, which is used to secure first part 24 and second part 26 together. In this example, swaged collar 28 is used with bolt member 30 as fastener assembly 22. In this example, swaged collar 28 is constructed of an aluminum material and bolt member 30 is constructed or a much harder material which can include for example, titanium. Fastener assembly 22, in many instances with respect to servicing aircraft 10, need to be removed for maintenance or replacement of parts. The removal of fastener assembly 22 is accomplished in this example as shown in FIGS. 3-6 by cutting swaged collar 28 into separate pieces and removing bolt member 30 from first part 24 and from second part 26. Similarly, a nut, not shown, would also be cut similarly into separate pieces permitting removal of its corresponding bolt member from the parts it joined.

Figure 6:
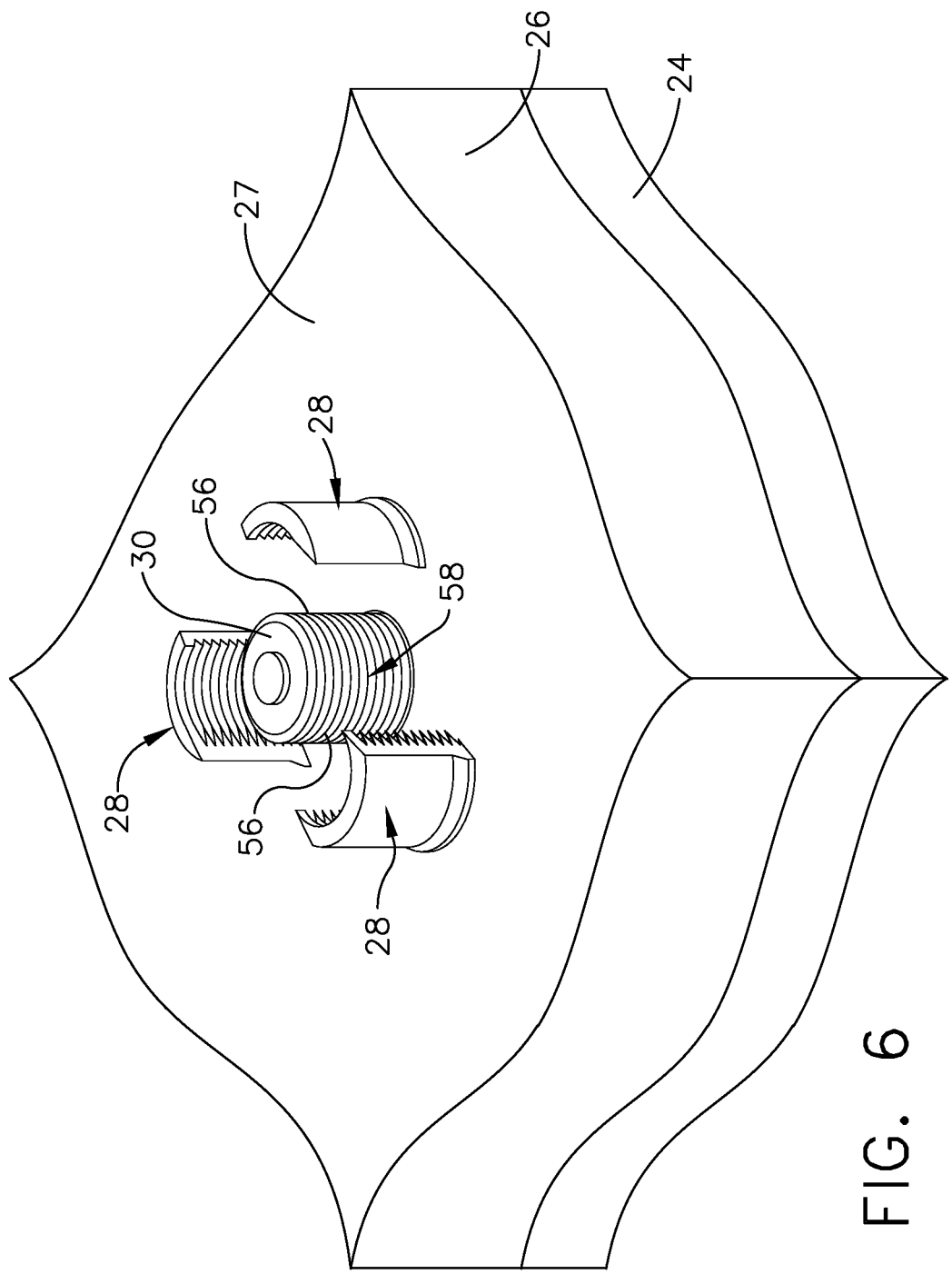
FIG. 6 is the view of FIG. 2 wherein the swaged collar is shown cut from the bolt member.

In referring to FIG. 3, blade assembly 32 for cutting member or in this example swaged collar 28 which surrounds bolt member 30 is shown. Blade assembly 32 includes first blade 34 having first cutting edge 36 aligned with first cutting plane (as represented by dotted line) 38, which extends in first direction (arrow) 40 from first cutting edge 36. First cutting plane 38 is a plane in which first cutting edge 36 will cut swaged collar 28. Blade assembly 32 further includes second blade 42 having second leading cutting edge 44 aligned with second cutting plane (as represented by dotted line) 46 which extends in second direction (arrow) 48 from second leading cutting edge 44. In this example, blade assembly 32 further includes third blade 50 having third leading cutting edge 52 aligned with third cutting plane (as represented by dotted line) 54 which extends in second direction (arrow) 48 from third leading cutting edge 52. As seen in FIG. 3, outermost circumference (indicated as dashed circle) 56 of bolt member 30 is seen in FIGS. 5 and 6. Outermost circumference 56 of bolt member 30 is the extent to which threads 58 furthest extend, as seen in FIG. 6. Outermost circumference 56 is visually hidden, in this example, with swaged collar 28 in a secured position as shown in FIGS. 3 and 4.

As seen in FIG. 3, first, second and third blades 34, 42 and 50, respectively, are associated with one another, such that first cutting edge 36 is spaced apart from the second and third leading cutting edges 44, 52. Also, first cutting plane 38 extends between second and third cutting planes 46, 54.

Blade assembly 32, as seen in FIG. 4, includes second blade 42 having second surface 60 which extends from second leading cutting edge 44 and third blade 50 has third surface 62 which extends from third leading cutting edge 52. Second surface 60 faces third surface 62. The distance D between second surface 60 and third surface 62 is greater than distance D' between second leading cutting edge and third leading cutting edge 44, 52. This configuration of providing a greater space between second and third blades 42, 50 than the space between second and third leading cutting edges 44, 52 permits a portion of swaged collar 28 that is cut by second and third leading cutting edges 44, 52, as seen in FIG. 5, to easily pass between second and third blades 42, 50 and not become lodged there between. The increased spacing between second and third blades 42 and 50 can be provided with various configurations. In this example, second surface 60 and third surface 62 are gradually sloped away from one another as second and third blades 42, 50 extend away from respective leading cutting edges, first leading cutting edge 44 and second leading cutting edge 52.

In referring to FIG. 3, in this example, distance D2 between first cutting plane 38 and second cutting plane 46 is the same as distance D3 between first cutting plane 38 and third cutting plane 54. With first, second and third cutting edges 36, 44 and 52 respectively, in a first position as seen in FIG. 3, first, second and third cutting edges 36, 44 and 52 respectively define space 64 which permits bolt member 30 with member, nut or swaged collar 28 which surrounds bolt member 30 to be positioned between first, second and third cutting edges 36, 44 and 52. First cutting plane 38 extends in first direction 40, such that with bolt member 30 with member, nut or swaged collar 28 which surrounds bolt member 30 positioned between first, second and third cutting edges 36, 44 and 52, first cutting plane 38 aligns with a central longitudinal axis 66 of bolt member 30. As seen in FIG. 3, with bolt member 30 with member, nut or swaged collar 28 which surrounds bolt member 30 positioned between first, second and third cutting edges 36, 44 and 52, second cutting plane 46 and third cutting plane 54 do not align with bolt member 30.

In the interest of not having second and third cutting edges 44, 52 impacting bolt member 30, distance D4 between second cutting plane 46 and third cutting plane 54 is a distance not less than diameter D5 of bolt member 30. With this configuration and relationship between second and third cutting planes 46 and 54, it will be appreciated as discussed herein that second and third cutting edges 44, 52 will not impact bolt member 30 in the cutting process of member, nut or swage collar 28.

In referring to FIG. 4, all of first cutting edge 36, on the one hand, and second and third cutting edges 44 and 52 have moved relatively closer to one another from a first position as shown in FIG. 3. First, second and third cutting edges 36, 44 and 52 have at least begun cutting member, nut or swaged collar 28 which surrounds bolt member 30.

In FIG. 5, first, second and third cutting edges 36, 44 and 52 have reached a second position wherein first cutting edge 36 is positioned relatively closer to second and third cutting edges 44, 52. As seen in FIG. 5, first cutting edge 36 has cut through swaged collar 28 and is positioned abutting bolt member 30 and second and third cutting edges 44, 52 have also cut swaged collar 28. In this example, swaged collar 28 has been cut into three pieces. In this example, second and third cutting planes 46 and 54 as seen in FIG. 3 are substantially tangential to bolt member 30 thereby resulting in second and third cutting edges 44, 52 not impacting bolt member 30 and at the same time second and third cutting edges 44, 52 also apply a prying action with respect to swaged collar 28. Second and third cutting edges 44, 52 moving through swaged collar 28 in a tangential relationship to bolt member 30 moves swaged collar 28 away from bolt member 30 facilitating, portions of swaged collar 28 that may be positioned in recesses of bolt member 30, to be pulled away from bolt member 30 and avoiding crimping of the swaged collar 28 material to bolt member 30. In other examples, the distance between second and third cutting planes can be slightly greater than a diameter of bolt member 30. In referring to FIG. 6, swaged collar 28 is shown as cut into three pieces as shown in FIG. 5.

Figure 7:
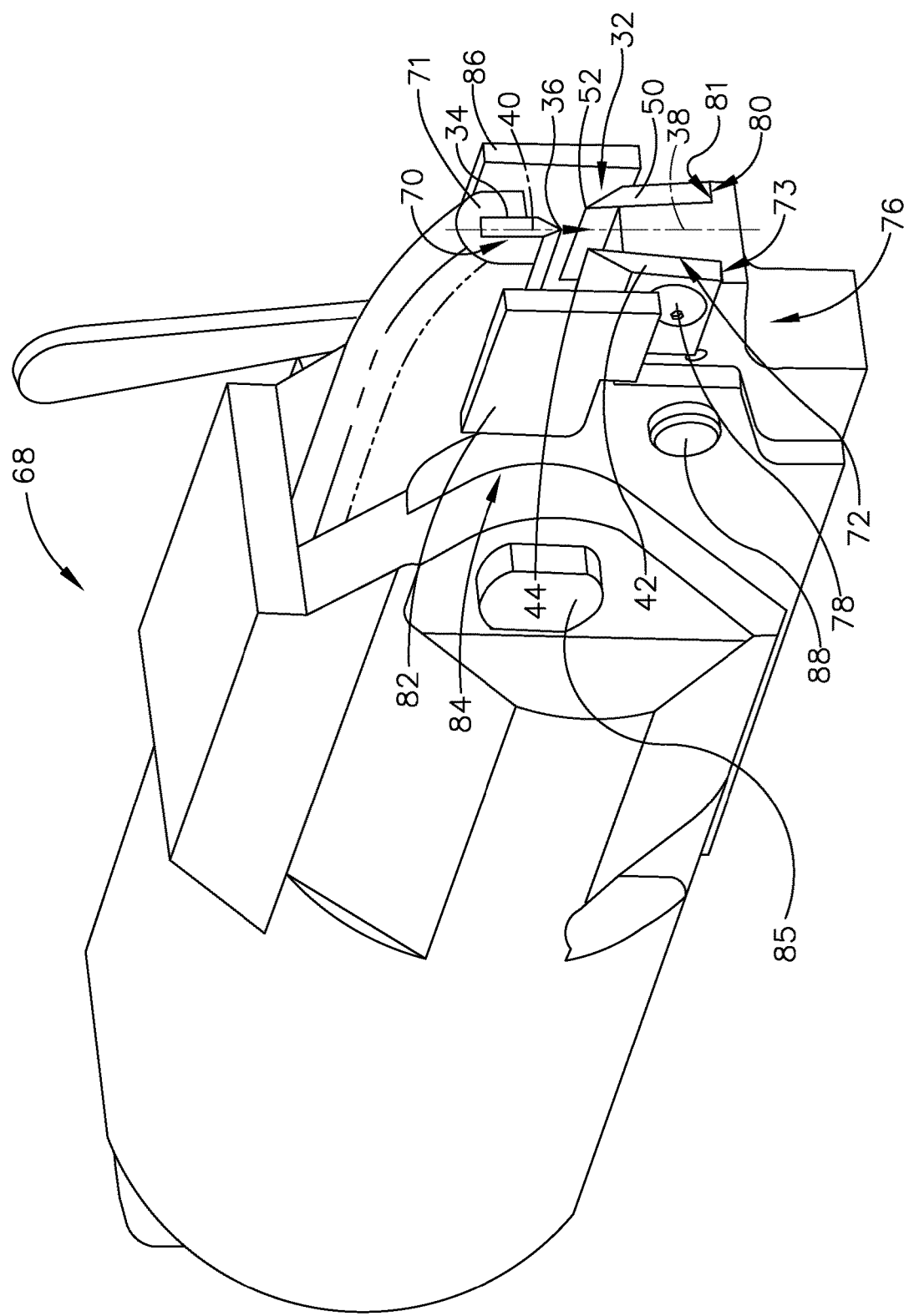
FIG. 7 is a perspective view of a cutting tool for cutting a swaged collar or nut from a bolt member.

In referring to FIG. 7, an example of cutting tool 68 for cutting member, nut or collar 28 which surrounds bolt member 30 is shown. A wide variety of configurations of tool 68 can be adapted and employed so as to apply needed cutting force to earlier described blade assembly 32. In one example, a pair of pivotally mounted handles, such as used for pliers, can be used wherein blade assembly 32 is mounted to the clamping ends of the plier tool configuration, such that with closing of the handles together blade assembly 32 is provided a cutting force. Another force application tool example is shown in FIG. 7 which is an adaptation of a tool referred to as "Alligator" style pneumatic rivet squeezer. The tool is adapted with removal of the tool jaws typically used to upset rivets and having tool jaws designed to hold first blade holder 70, second blade holder 72 and third blade holder 80 wherein, in this example, second and third blade holders 72, 80 are associated with blade holder frame 76. In this example, second blade holder 72 and third blade holder 80 along with blade holder frame 76 are secured to housing 84 and remain in a fixed position during operation of tool 68. First blade holder 70 is pivotally mounted relative to housing 84 at pivot location 85. First blade holder 70 pivots upon application of force from a pneumatic cylinder within housing 84. At rest blade assembly 32 accommodates member which surrounds bolt member 30 and with application of pneumatic force first blade holder 70 rotates and first blade 40, second blade 42 and third blade 50 cut member, nut or swaged collar 28.

Tool 68 includes first blade holder 70 which secures first blade 34. In this example first blade holder 70 includes a channel bracket 71 which receives first blade 34 and is secured within channel 71 with a securement or set screw (not shown). First blade 34 has first cutting edge 36 aligned with first cutting plane 38 which extends in first direction 40 from the first cutting edge 36. Second blade holder 72 secures second blade 42. In this example, second blade holder 72 includes a recess 73 positioned within blade holder frame 76 which supports second blade 42 and second blade 42 is secured to blade holder frame 76 with set screw 78. Second blade 42 has second cutting edge 44 aligned with second cutting plane 46 which extends in second direction 48 from second cutting edge 44, as seen in FIG. 3. Tool 68 further includes third blade holder 80 securing third blade 50. Third blade holder 80 includes recess 81 positioned within blade holder frame 76 and third blade 50 is secured to blade holder frame 76 with a set screw (not shown). Third blade 50 has third cutting edge 52 aligned with third cutting plane 54 which extends in second direction 48 from third cutting edge 44, as seen in FIG. 3.

First blade holder 70, second blade holder 72 and third blade holder 80 are associated with one another such that with first blade holder 70, on the one hand, and the second and third blade holder 72, 80, on the other hand, are movable relative to one another. In the example of cutting tool 68 shown in FIG. 7, first blade holder 70 is moved while second and third blade holders 72, 80 remain in a fixed position. First cutting edge 36 is spaced apart from second and third cutting edges 44, 52. First cutting plane 38 extends between second and third cutting planes 46, 54 as seen in FIGS. 3 and 7.

Cutting tool 68, as similarly previously discussed, includes second blade 42 having second surface 60 which extends from second cutting edge 44, as seen in FIG. 4, and includes third blade 50 having third surface 62 which extends third cutting edge 52. This spacing configuration permits, as discussed earlier, for a portion of cut swaged collar 28, as seen in FIG. 5, to pass between second and third blades 42, 50 and not be jammed there between.

With respect to cutting tool 68, distance D2, as seen in FIG. 3, between first cutting plane 38 and second cutting plane 46 is the same as distance D3 between first cutting plane 38 and third cutting plane 54. With first, second and third cutting edges 36, 44 and 52 in a first position, as seen in FIG. 3, first, second and third cutting edges 36, 44 and 52 define space 64, as discussed earlier, which permits bolt member 30 with member, nut or swaged collar 28 which surrounds bolt member 30 to be positioned between first, second and third cutting edges 36, 44 and 52. With bolt member 30 with member, nut or swaged collar 28 which surrounds bolt member 30 positioned between first, second and third cutting edges 36, 44 and 52 first cutting plane 38 aligns with central longitudinal axis 66 of bolt member 30, as seen in FIG. 3.

With respect to cutting tool 68, second cutting plane 46 and third cutting plane 54 do not align with bolt member 30 and do align with member, nut or swaged collar 28 which surrounds bolt member 30. Distance D4 between second cutting plane 46 and third cutting plane 54 is a distance not less than diameter D5 of bolt member 30. With first, second and third cutting edges 36, 44 and 52 of cutting tool 68 positioned into second position, as seen in FIG. 5, first cutting edge 36 is positioned closer to second and third cutting edges 44, 52 than in the first position, as seen in FIG. 3. In the second position, first, second and third cutting edges 36, 44 and 52 have cut member 28, which surrounds bolt member 30, into three pieces without second and third cutting edges impacting bolt member 30.

As seen in FIG. 7, cutting tool 68 further includes first guard plate 82 is secured (not shown) to housing 84. Housing 84 is connected to the second and third blade holders 78, 80, in this example, through blade holder frame 76. First guard plate 82 is positioned spaced apart from and extending along first and second blade holders 70, 72. Second guard plate 86 is secured (not shown) to housing 84. Second guard plate 86 is positioned spaced apart from first guard plate 82 and is positioned spaced apart from and extending along the first and third blade holders 70, 80.

In this example of cutting tool 68, second and third blades 42, 50 can easily be replaced as a unit or separately. For example, if a different bolt member 30 is encountered which has a different diameter D5 a new accommodating spacing between second and third blades 42 and 50 is needed such that the distance D4 between second and third cutting edges 44, 52 exceeds diameter D5. This can be easily accomplished with removing blade holder frame 76 by removing screw 88 and unsecure blade holder frame 76 from housing 84. A different blade holder frame 76 can be inserted and secured with screw 88 to housing 84 wherein second and third blades 44 and 52 now accommodate new bolt member 30 diameter D5 such that second and third blades 44 and 52 do not impact bolt member 30. With a securement with screw 88 positioned on an external portion of housing 84, this provides the user ease in removing and replacing blade holder frame 76. Moreover, separately replacing second and third blades 42, 50 is easily carried out with releasing and securing screw fastener 78, positioned outside of housing 84, for cutting blade 42 and similarly releasing and securing (not shown) for third blade cutting blade 50. Replacement of second and third blades 42, 50 for example do not require any disassembly of housing 84. This is similarly the case for first cutting blade 34 which is releasably secured to first blade holder 70 with a screw or set screw (not shown) positioned and accessed from outside of first blade holder 70.

In addition, with a slight arc of travel for first cutting blade 34 relative to fixed positioned second and third cutting blades 42 and 50, as seen with cutting tool 68 in FIG. 7, cutting damage can be avoided to surface 27 of part 26 in FIG. 6 when removing swaged collar 28.

Figure 8:
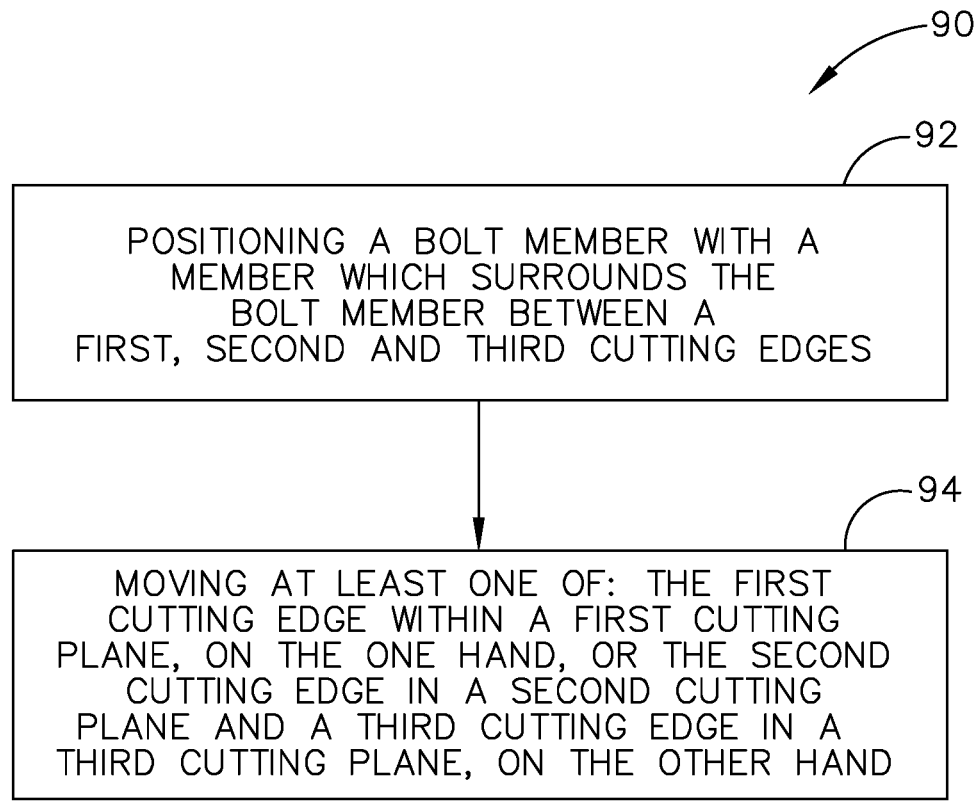
FIG. 8 is a flow chart for a method for cutting a swaged collar or nut from a bolt member.

In referring to FIG. 8, method 90 of cutting member, nut or swaged collar 28 which surrounds bolt member 30 includes step 92 of positioning bolt member 30 with member 28 which surrounds bolt member 30, as seen in FIG. 3, between first cutting edge 36 of first blade 34, second cutting edge 44 of second blade 42 and third cutting edge 52 of third blade member 52. Method 90 further includes step 94 of moving at least one of: first cutting edge 36 within first cutting plane 38, on the one hand, or second cutting edge 44 in second cutting plane 46 and third cutting edge 52 in third cutting plane 54, on the other hand, such that the member which surrounds bolt member 30 is cut into three pieces.

Step 92 of positioning further includes positioning first cutting edge 36 such that first cutting plane 38 is in alignment with longitudinal axis 66 of bolt member 30, as seen in FIG. 3. Step 92 of positioning further includes positioning second cutting edge 44 along second cutting plane 46 not aligned with bolt member 30. Step 92 of positioning further includes positioning third cutting edge 52 along third cutting plane 54 not aligned with bolt member 30 wherein bolt member 30 is positioned between second and third cutting planes 46 and 54.

While various embodiments have been described above, this disclosure is not intended to be limited thereto. Variations can be made to the disclosed embodiments that are still within the scope of the appended claims.

What is claimed:

1. A blade assembly for cutting a member which is secured to and surrounds a bolt member, comprising:
   a first blade including a first cutting edge, the first cutting edge aligned with a first cutting plane, the first cutting plane extends in a first direction from the first cutting edge;
   a second blade including a second cutting edge aligned with a second cutting plane which extends in a second direction from the second cutting edge;
   a third blade including a third cutting edge aligned with a third cutting plane which extends in the second direction from the third cutting edge, wherein the second cutting plane and the third cutting plane are parallel to one another, wherein:
   the second blade and the third blade are disposed in a fixed position such that the second blade and the third blade are stationary;
   the first cutting edge is spaced apart from the second and third cutting edges;
   the second and third cutting edges are spaced apart from one another;
   the first cutting plane extends between the second and third cutting planes;
   with the first cutting edge, the second cutting edge and the third cutting edge in a first position, the member, which surrounds the bolt member, is positionable between the first cutting edge, the second cutting edge, and the third cutting edge, wherein the first cutting plane aligns with a central longitudinal axis of the bolt member such that the central longitudinal axis of the bolt member extends within and along the first cutting plane; and
   wherein the first blade is movable to a second position relative to the fixed position of the second blade and the third blade, in which the first blade travels on an arc to the second position which causes the first cutting edge, the second cutting edge, and the third cutting edge to cut the member around the bolt member into three pieces, and the second cutting edge and the third cutting edge are angled relative to each other to move the pieces away from the bolt member when the first blade moves to the second position.

2. The blade assembly of claim 1, wherein:
   the second blade includes a second blade surface which extends along the second blade away from the second cutting edge;
   the third blade includes a third blade surface which extends along the third blade away from the third cutting edge;

the second blade surface faces the third blade surface; and
a distance between the second blade surface and the third blade surface is greater than a distance between the second cutting edge and the third cutting edge.

3. The blade assembly of claim 1, wherein a distance between the first cutting plane and the second cutting plane is the same as a distance between the first cutting plane and the third cutting plane.

4. The blade assembly of claim 1, wherein, with the first cutting edge in the second position, the first cutting edge is positioned closer to the second and third cutting edges than with respect to the first position, such that the first cutting edge, the second cutting edge and the third cutting edge cut the member around the bolt member into the three pieces without the second and third cutting planes extending through the bolt member.

5. A cutting tool for cutting a member which is secured to and surrounds a bolt member, comprising:
a housing;
a first blade holder pivotably mounted to the housing relative to a pivot point;
a first blade secured to the first blade holder such that the first blade is movable on an arc to a second position when the first blade holder pivots relative to the pivot point, the first blade includes a first cutting edge aligned with a first cutting plane, and the first cutting plane extends in a first direction from the first cutting edge;
a second blade holder fixed to the housing;
a second blade secured to the second blade holder, the second blade includes a second cutting edge aligned with a second cutting plane which second cutting plane extends in a second direction from the second cutting edge;
a third blade holder fixed to the housing;
a third blade secured to the third blade holder, the third blade including a third cutting edge aligned with a third cutting plane which third cutting plane extends in the second direction from the third cutting edge, and the second cutting plane and the third cutting plane are parallel to one another, wherein the first blade holder, the second blade holder and the third blade holder are associated with one another such that with the first blade holder, is movable relative to the second blade holder and the third blade holder, wherein:
the second blade and the third blade are disposed in a fixed position relative to the second blade holder and the third blade holder, respectively;
the first cutting edge is spaced apart from the second and third cutting edges;
the second and third cutting edges are spaced apart from one another;
the first cutting plane extends between the second and third cutting planes;
with the first cutting edge, the second cutting edge and the third cutting edge in a first position the member, which surrounds the bolt member, is positionable between the first, second, and third cutting edges, wherein the first cutting plane aligns with a central longitudinal axis of the bolt member such that the central longitudinal axis of the bolt member extends within and along the first cutting plane; and
wherein the first blade is movable to the second position relative to the fixed position of the second blade and the third blade, in which the first blade travels on the arc to the second position which causes the first cutting edge, the second cutting edge, and the third cutting edge to cut the member around the bolt member into three pieces, and the second cutting edge and the third cutting edge are angled relative to each other to move the pieces away from the bolt member when the first blade moves to the second position.

6. The cutting tool of claim 5, wherein:
the second blade includes a second blade surface which extends along the second blade away from the second cutting edge;
the third blade includes a third blade surface which extends along the third blade away from the third cutting edge, wherein:
the second blade surface faces the third blade surface; and
a distance between the second blade surface and the third blade surface is greater than a distance between the second cutting edge and the third cutting edge.

7. The cutting tool of claim 5, wherein a distance between the first cutting plane and the second cutting plane is the same as a distance between the first cutting plane the third cutting plane.

8. The cutting tool of claim 5, wherein:
the second cutting plane and the third cutting plane align with the member which surrounds the bolt member.

9. The cutting tool of claim 5, wherein with the first cutting edge in the second position, the first cutting edge is positioned closer to the second cutting edge and the third cutting edge to cut the member around the bolt member into the three pieces without the second and third cutting planes extending through the bolt member.

10. The cutting tool of claim 5 further including:
a first guard plate is secured to the housing, wherein:
the housing is connected to the second and third blade holders; and
the first guard plate is positioned spaced apart from and extending along the first and second blade holders; and
a second guard plate is secured to the housing, wherein:
the second guard plate is positioned spaced apart from the first guard plate; and
the second guard plate is positioned spaced apart from and extending along the first and third blade holders.

11. The cutting tool of claim 10, further includes a blade holder frame secured to the housing which supports the second and third blade holders.

12. A method of cutting a member which is secured to and surrounds a bolt member, comprising the steps of:
positioning the bolt member and the member which is secured to and surrounds the bolt member, between a first cutting edge of a first blade, a second cutting edge of a second blade, and a third cutting edge of a third blade, wherein the first blade, the second blade, and the third blade are in a first position such that the first cutting edge aligns with a first cutting plane, which aligns with a central longitudinal axis of the bolt member, wherein the central longitudinal axis of the bolt member is positioned within and along the first cutting plane, wherein:
the second cutting edge aligns with a second cutting plane, which extends from the second cutting edge;
the third cutting edge is aligned with a third cutting plane, which extends from the third cutting edge, and the second cutting plane and the third cutting plane are parallel to one another; and
the first cutting plane extends between the second cutting plane and the third cutting plane; and
moving the first blade relative to the second blade and the third blade which are stationary, wherein the first blade having the first cutting edge within the first cutting plane moves from the first position to a second position such that the first blade travels on an arc to the second position which causes the first cutting edge, the second cutting edge and the third cutting edge cut the member into three pieces, and the second cutting edge and the third cutting edge are angled relative to each other to move the pieces away from the bolt member when the first blade moves to the second position.

13. The blade assembly claim 1, wherein a distance between the first cutting plane and the second cutting plane is the same distance as a distance between the first cutting plane and the third cutting plane when the first cutting edge is in the first position.

14. The blade assembly of claim 1, wherein the second cutting plane is tangential to an outermost circumference of the bolt member and the third cutting plane is tangential to the outermost circumference of the bolt member when the first cutting edge is in the first position.

15. The blade assembly of claim 2, wherein the second blade surface and the third blade surface extend away from one another as the second and third blade surfaces extend away from the second cutting edge and the third cutting edge, respectively.

16. The cutting tool of claim 5, wherein a distance between the first cutting plane and the second cutting plane is the same distance as a distance between the first cutting plane and the third cutting plane when the first cutting edge is in the first position.

17. The cutting tool of claim 5, wherein with the first cutting edge, the second leading cutting edge and the third cutting edge in the first position, the second cutting plane is tangential to an outermost circumference of the bolt member and the third cutting plane is tangential to the outermost circumference of the bolt member.

18. The cutting tool of claim 6, wherein the second blade surface and the third blade surface extend away from one another as the second and third blade surfaces extend away from the second cutting edge and the third cutting edge, respectively.

19. The method of claim 12, wherein the second cutting plane is tangential to an outermost circumference of the bolt member and the third cutting plane is tangential to the outermost circumference of the bolt member when the first blade is in the first position.

20. The method of claim 12, wherein:
the second blade having the second cutting edge includes a second blade surface which extends from the second cutting edge;
the third blade having the third cutting edge includes a third blade surface which extends from the third cutting edge;
the second blade surface faces the third blade surface; and
a distance between the second blade surface and the third blade surface is greater than a distance between the second cutting edge and the third cutting edge.

* * * * *

UNITED STATES PATENT AND TRADEMARK OFFICE
CERTIFICATE OF CORRECTION

| | |
|---|---|
| PATENT NO. | : 11,717,899 B2 |
| APPLICATION NO. | : 15/672471 |
| DATED | : August 8, 2023 |
| INVENTOR(S) | : Avery C. Alby and Wyatt J. Lofftus |

It is certified that error appears in the above-identified patent and that said Letters Patent is hereby corrected as shown below:

In the Claims

Claim 5, Column 9, Line 43: "blade holder, is movable" should read --blade holder is movable--;
Claim 17, Column 12, Line 2: "the second leading cutting edge" should read --the second cutting edge--.

Signed and Sealed this
Eighteenth Day of June, 2024

*Katherine Kelly Vidal*

Katherine Kelly Vidal
*Director of the United States Patent and Trademark Office*